United States Patent [19]

Gooding

[11] 4,006,264

[45] Feb. 1, 1977

[54] PREPARATION OF CONFECTIONERS' FATS

[75] Inventor: Chester Martin Gooding, Westfield, N.J.

[73] Assignee: CPC International Inc., Englewood Cliffs, N.J.

[22] Filed: Jan. 10, 1975

[21] Appl. No.: 540,053

Related U.S. Application Data

[63] Continuation of Ser. No. 411,523, Oct. 31, 1973, abandoned.

[52] U.S. Cl. ................................ 426/607; 426/417

[51] Int. Cl.[2] .......................................... A23D 5/00

[58] Field of Search .......... 426/607, 313, 362, 417, 426/607

[56] References Cited

UNITED STATES PATENTS 3,512,994 5/1970 Brown et al. ...................... 426/362

*Primary Examiner*—Raymond N. Jones

*Attorney, Agent, or Firm*—Salvatore C. Mitri

[57] ABSTRACT

Confectioners' fats are prepared by hydrogenating a lauric fat to an iodine value less than about 3.0, crystallizing the fat at a temperature between 90° F and 110° F, and recovering the liquid fraction. The liquid fraction is the desired confectioners' fat which contains more lauric acid and less stearic acid than the uncrystallized lauric fat.

3 Claims, No Drawings

PREPARATION OF CONFECTIONERS' FATS

This application is a continuation application of U.S. application Ser. No. 411,523, filed Oct. 31, 1973 now abandoned.

This invention relates to an improved non-solvent for the preparation of confectioners' fats by a nonsolvent fractionation process.

It has long been a practice in the art of preparation of confectioners' fats to improve the characteristics of palm kernel and coconut oil with separation of these oils into liquid and solid fractions by chilling to partially crystallize these fats and then remove the undesirable liquid fraction by filtration, usually with the use of hydraulic pressure. The retained filter cake is the desired product having improved characteristics. The filter cake contains more lauric acid and less stearic acid than does the original lauric fat. By the term "lauric fat" is meant a fat containing a substantial amount of lauric and myristic acid, the total usually being more than 50% of the fatty acids of the glyceride. The remaining fatty acids are predominantly fatty acids having 6, 8, 10, 16 and 18 carbon atoms. Examples of lauric fats are palm kernel oil, coconut oil, babassu oil and cohune oil and their corresponding partially or completely hydrogenated forms. The non-lauric fat portion contains at least about 30% palmitic acid.

In more recent practice, much use has been made of solvents as diluents for the crystallizing fat whereby the use of labor intensive hydraulic pressing operations are avoided.

Still more recently, crystallization of lauric fats has been done while dispersing the fat in water during crystallization or subsequent to crystallization by chilling. The three phase system of crystallized fat, liquid fat and water is separated by centrifuge wherein an added wetting agent permits the water to wash the liquid fat from the crystallized portion. Here again, the liquid fraction is the by-product and it is the crystallized fraction which contains the increased amount of lauric acid. In each of the processes of the prior art the crystallized fraction possesses a significant iodine value although it may be subsequently hydrogenated if desired.

The lauric and myristic content of lauric fats has been increased for confectionery uses by reaction with these acids in such a way as to displace some of the undesirable lower acids. The need for fractionation by hydraulic pressing is avoided.

The same objects have been achieved by direct interesterification or by interesterification with alkyl esters of lauric and myristic acids.

An object of this invention is to provide a process for improving the characteristics of a hydrogenated lauric fat for use as a confectioners' fat.

Another object of this invention is to improve the yield of confectioners' fats as compared with processes of the present art and to eliminate problems of utilization of by-products which accumulate from the employment of procedures presently known to the art.

I have discovered that lauric acid content (and often the myristic acid content) can be increased and the stearic acid content can be decreased by conducting a crystallization of hydrogenated lauric fat at controlled, elevated temperatures whereby the liquid portion rather than the filter cake contains the desired increased lauric acid content and decreased stearic acid content.

It is to be understood that, whereas the following examples illustrate methods of carrying out the present invention, these examples are given for purposes of illustration and not of limitation.

EXAMPLE I

Hydrogenated palm kernel oil having a melting point of 111.2° F and an iodine value of 0.4 is crystallized with slow agitation at a temperature of 99° F for 18 hours.

The fluid mixture was filtered to yield a filtrate product having a Wiley melting point of 95.7° F and an iodine value of 0.5. Its lauric acid content was 54% and its myristic acid content was 16.9% whereas the original hydrogenated palm kernel oil contained 50.5% lauric acid and 16.1% myristic acid. The corresponding stearic acid values were 16.6% at start and 12.6% after crystallization.

EXAMPLE II

A palm kernel oil was hydrogenated to an iodine value of 1.7 and a melting point of 112.5° F. The hydrogenated fat was partially crystallized at 109° F as in Example I before separating the mixture into liquid and solid fractions. The 91.7% liquid fraction was found to have a melting point of 105.1° F and an iodine value of 0.9. The filter cake had a melting point of 140.7° F and an iodine value of 5.2. The lauric acid content of the filtrate was 47.6% as compared with the lauric acid content of the whole hydrogenated palm kernel oil at 45.6%. The myristic acid content remained about the same and the stearic acid content was decreased from 22% in the starting oil to 18% in the desired filtrate.

EXAMPLE III

A hydrogenated palm kernel oil having a melting point of 113.0° F and an iodine value of 0.5 was crystallized with slow stirring at a temperature of 100° F for 5 days before separating the mixture into liquid and solid portions.

The desired liquid portion was found to have a melting point of 93.2° F and an iodine value of 0.7. Its lauric acid content was 53.5% and its myristic acid content was 16.7%. These values were compared with those of the hydrogenated whole palm kernel oil which were 48.5% and 16.5% respectively. The corresponding stearic acid contents were 12.9% and 11.9% respectively.

EXAMPLE IV

A mixture of 80 parts of hydrogenated palm kernel oil and 20 parts of hydrogenated palm oil was interesterified. After washing in the usual manner, the ester interchanged product had a melting point of 101.6° F and an iodine value of 1.0. The randomized mixture of fats was crystallized at 98° to 99° while slowly stirring for 3 days. Upon filtration, the 77% of liquid portion was found to have a Wiley melting point of 97.5° F and an iodine value of 0.5. Its lauric acid content was 48.5% and its stearic acid content was 20.6%. These values were calculated to have been 45% and 25% respectively in the interesterified starting mixture.

Based upon the foregoing Examples, the stearic acid and lauric acid content of the confectioners' fat can also be expressed in terms of a range percent of their decrease and increase, respectively. Using the values from the Examples of the starting and final amounts of these acids, the percent change of increase of lauric acid and decrease in stearic acid can be determined as shown below in Table I.

Table I

Percent Increase in Lauric Acid and Percent Decrease in Stearic Acid

| | Start (%) | Final (%) | Difference (%) | Increase (%) |
|---|---|---|---|---|
| LAURIC ACID | | | | |
| Example I | 50.5 | 54.0 | 54.0−50.5=3.5 | 3.5÷50.5 × 100=6.9 |
| Example II | 45.6 | 47.6 | 47.6−45.6=2.0 | 2.0÷45.6 × 100=4.9 |
| Example III | 48.5 | 53.5 | 53.5−48.5=5.0 | 5.0÷48.5 × 100=10.3 |
| Example IV | 45.0 | 48.5 | 48.5−45.0=3.5 | 3.5÷45.0 × 100=7.8 |
| STEARIC ACID | Start (%) | Final (%) | Difference (%) | Decrease (%) |
| Example I | 16.6 | 12.6 | 16.6−12.6=4.0 | 4.0÷16.6 × 100=24.0 |
| Example II | 22.0 | 18.0 | 22.0−18.0=4.0 | 4.0÷22.0 × 100=18.2 |
| Example III | 12.9 | 11.9 | 12.9−11.9=1.0 | 1.0÷12.9 × 100= 7.7 |
| Example IV | 25.0 | 20.6 | 25.0−20.6=4.4 | 4.4÷25.0 × 100=17.8 |

As can be seen from the above, the range percent increase for lauric acid was 4.9–10.3% as derived from the values obtained in Examples II and III while the range percent decrease for stearic acid was 7.7–24.0% as derived from the values obtained in Examples I and III.

As set forth in Table II below, the ratio of lauric acid to stearic acid in the final product can be similarly computed from the final values of these acids shown in Table I above.

Table II

Ratio of Lauric Acid to Stearic Acid in Final Product

| Example | Final % Lauric Acid | Final % Stearic Acid | Lauric Acid/Stearic Acid | = Ratio |
|---|---|---|---|---|
| I | 54.0 | 12.6 | 54.0/12.6 | 4.3:1 |
| II | 47.6 | 18.0 | 47.6/18.0 | 2.6:1 |
| III | 53.5 | 11.9 | 53.5/11.9 | 4.5:1 |
| IV | 48.5 | 20.6 | 48.5/20.6 | 2.4:1 |

Thus, the ratio range of lauric acid to stearic acid is about 2.4:1–4.5:1 as derived from Examples III and IV, respectively.

Many other useful products may be had from interesterified mixtures of hydrogenated lauric fats in combination with cottonseed stearine, palm oil, palm stearine, etc. by the process of non-solvent fractionation disclosed herein.

While the invention has been described herein by reference to specific embodiments thereof, it should be understood that it is capable of further modification, and this application is to cover any variations, uses, or applications of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:

1. A process for preparing a liquid fraction confectioners' fat comprising:

randomizing by interesterification a mixture of a hydrogenated lauric fat and a hydrogenated non-lauric fat portion, said lauric fat portion containing fatty acids having predominantly 6, 8, 10, 16 and 18 carbon atoms, the non-lauric fat portion containing at least 30% palmitic acid said mixture having an iodine value of less than about 3.0, crystallizing the randomized mixture of fats at a temperature between about 90° F. and 110° F. for a period of time sufficient to obtain a solid filter cake fraction and a liquid filtrate fraction wherein the liquid fraction contains more lauric acid and less stearic acid than is contained in the uncrystallized, randomized mixture, said stearic acid content being reduced by about 7.7%–24% and said lauric acid content being increased by about 4.9%–10.3%; and, recovering the liquid fraction.

2. The process of claim 1 wherein the randomized fat is crystallized at a temperature between about 98° F. and 103° F.

3. A confectioners' fat produced by the method of claim 1 comprising more lauric acid than stearic acid, the ratio of lauric acid to stearic acid being about 2.4:1 to 4.5:1.

* * * * *